(12) United States Patent
Cotner

(10) Patent No.: US 7,827,212 B2
(45) Date of Patent: Nov. 2, 2010

(54) SYSTEM AND METHOD FOR IMPROVED CLEARING OF JAVA OBJECT'S VARIABLES

(75) Inventor: Curt Lee Cotner, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 10/444,676

(22) Filed: May 22, 2003

(65) Prior Publication Data

US 2004/0236712 A1 Nov. 25, 2004

(51) Int. Cl.
G06F 12/00 (2006.01)
(52) U.S. Cl. .................................... 707/813
(58) Field of Classification Search .............. 707/206, 707/205, 813
See application file for complete search history.

(56) References Cited

U.S. PATENT DOCUMENTS

| | | | |
|---|---|---|---|
| 5,392,432 A * | 2/1995 | Engelstad et al. | 707/103 R |
| 5,485,613 A * | 1/1996 | Engelstad et al. | 707/206 |
| 5,524,241 A * | 6/1996 | Ghoneimy et al. | 707/10 |
| 5,761,513 A * | 6/1998 | Yellin et al. | 717/127 |
| 5,844,980 A * | 12/1998 | Patel et al. | 379/88.22 |
| 6,047,125 A * | 4/2000 | Agesen et al. | 717/148 |
| 6,070,173 A * | 5/2000 | Huber et al. | 707/206 |
| 6,192,517 B1 * | 2/2001 | Agesen et al. | 717/154 |
| 6,338,073 B1 * | 1/2002 | Houldsworth et al. | 707/206 |
| 6,381,738 B1 * | 4/2002 | Choi et al. | 717/140 |
| 6,393,439 B1 * | 5/2002 | Houldsworth et al. | 707/206 |
| 6,418,542 B1 | 7/2002 | Yeager | |
| 6,446,225 B1 | 9/2002 | Robsman et al. | |
| 6,457,142 B1 | 9/2002 | Klemm et al. | |
| 6,571,260 B1 * | 5/2003 | Morris | 707/206 |
| 6,671,707 B1 * | 12/2003 | Hudson et al. | 707/206 |
| 2002/0138665 A1 | 9/2002 | Scheetz et al. | |
| 2002/0162053 A1 | 10/2002 | Os | |
| 2004/0139272 A1 * | 7/2004 | Rodriguez-Rivera et al. | 711/100 |

OTHER PUBLICATIONS

Boehm, Hans-J, "Destructors, Finalizers, and Synchronization", Jan. 2003, ACM, 1-58113-628-5/03/001, pp. 262-272.*
Hayes, Barry, "Ephemerons: A New Finalization Mechanism", 1997, ACM, 0-89791-908-4/97/0010, pp. 176-183.*
Domani et al., "Implementing an On-the-fly Garbage Collector for Java", 2000, ACM, 1-58113-263-8/00/10, pp. 155-166.*

* cited by examiner

*Primary Examiner*—Wilson Lee
*Assistant Examiner*—Michael Le
(74) *Attorney, Agent, or Firm*—Kunzler Needham Massey & Thorpe

(57) ABSTRACT

An apparatus and a method of clearing a runtime data area where software objects store variables and each software object has a finalize method where the invention drives the finalize method of a software object when the finalize method of the software object has not performed an operation for a predetermined time period.

23 Claims, 3 Drawing Sheets

SYSTEM AND METHOD FOR IMPROVED CLEARING OF JAVA OBJECT'S VARIABLES

BACKGROUND OF THE INVENTION

1. Field of the Invention

This invention relates to object oriented runtime data area management systems and methods, and more particularly to Java™ automatic storage management systems and methods.

2. Description of Related Art

In object oriented software environments when an object instance is created, one or more sections of a runtime data area or memory are assigned for the instance's variables. When the object is complete (its variables are out of scope), the object's variables assigned data area is ideally released or cleaned. These released or cleaned data or memory areas may then be assigned to other object instance's variables. In the Java platform, an automatic storage management object, termed "garbage collector" is instantiated periodically or upon request.

The garbage collector instance attempts to clean the runtime data area by detecting objects instances that are "out of scope" and removing their associated variables from the runtime data area. Java objects may include a finalize method that must be invoked before an object instance is destroyed and its variables cleaned from memory (the runtime data area). The garbage collector instance creates a thread for the finalize method of such objects. In some cases an object's finalize method may require one or more external events to be completed before it ends. In these cases, the finalize method thread may "hang" waiting for these external event completions. The garage collection object instance then is hung while waiting for the finalize method thread to end. In the interim no runtime data area is cleansed although new object instances may continue to be created and assigned runtime data area segment(s). Eventually, insufficient runtime data area segment(s) (memory) may be available for assignment. Thus, a need exists for a method, system, and mechanism that prevent the garbage collection object instance hanging due to a hung finalize method thread.

SUMMARY OF THE INVENTION

The present invention is an apparatus and a method of clearing a runtime data area where a plurality of software objects store a variable in the runtime data area and each of the plurality of software objects has a finalize method. The method drives the finalize method of one of the plurality of software objects. The method also clears the runtime area where the one of plurality of software objects variable was stored when the driven finalize method ends. The method drives the finalize method of another of the plurality of software objects when the finalize method of the one of the plurality of software objects has not performed an operation for a predetermined time period.

In another embodiment, the invention may mark the one of the plurality of objects as uncollectible when the finalize method of the one of the plurality of software objects has not performed an operation for a predetermined time period. In a further embodiment the invention determines whether the finalize method of the one of the plurality of software objects may be restarted when the finalize method of the one of the plurality of software objects has not performed an operation for a predetermined time period. In this embodiment, the invention also marks the one of the plurality of objects as uncollectible when the finalize method of the one of the plurality of software objects may not be restarted. In this embodiment, the invention further re-queues the one of the plurality of software objects for collection when the finalize method of the one of the plurality of software objects may be restarted.

In another embodiment then invention may generate a finalize exception when the finalize method of one of the plurality of software objects has not performed an operation for a predetermined time period. In this embodiment the invention may further drive the finalize method of another of the plurality of software objects when a finalize exception has been generated. In a further embodiment, the invention may determine whether the finalize method of one of the plurality of software objects may be restarted when a finalize exception has been generated. The invention may also mark the one of the plurality of objects as uncollectible when the finalize method of the one of the plurality of software objects may not be restarted. The invention may further re-queue the one of the plurality of software objects for collection when the finalize method of the one of the plurality of software objects may be restarted.

The invention may determine whether one of the plurality of objects is out of scope and drive the finalize method of the one of the plurality of software objects determined to be out of scope. In one embodiment at least one of the plurality of software objects is a Java™ object.

BRIEF DESCRIPTION OF THE DRAWINGS

Like reference numbers and designations in the various drawings indicate like elements.

DETAILED DESCRIPTION OF THE PREFERRED EMBODIMENTS

Throughout this description, the preferred embodiment and examples shown should be considered as exemplars, rather than as limitations on the present invention.

Figure 1:
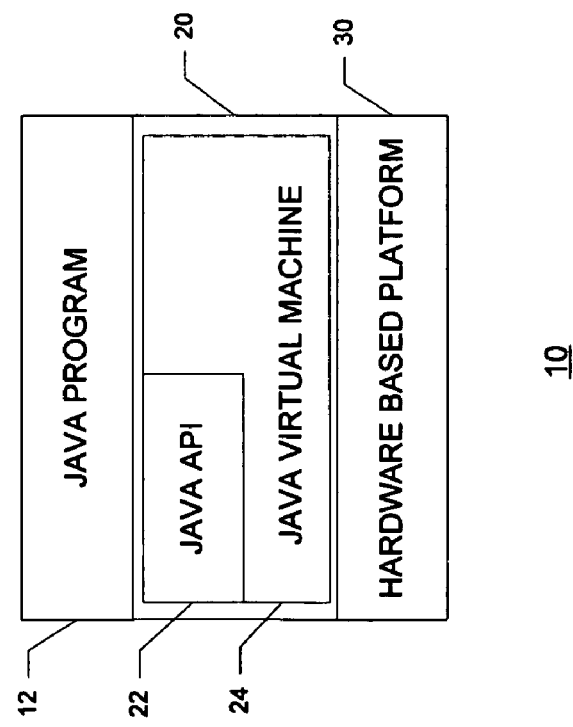
FIG. 1 is a diagram of a program running on a Java platform in which a method of the present invention may be employed.

FIG. 1 is a diagram of a program platform 10 in which a method of the present invention may be employed. In this platform 10, a Java platform 20 acts as an interface between a hardware based platform 30 and a Java program 12 to be executed. The Java platform 20 includes a Java Virtual Machine ("JVM") 24 and Java Application Programming Interface ("API"). The Java platform 20 is a software only platform that runs on top of a hardware based platform 30 where the hardware based platforms are native to the hardware such as MS® Windows®, Linux®, Solaris®, or MacOS®.

Figure 2:
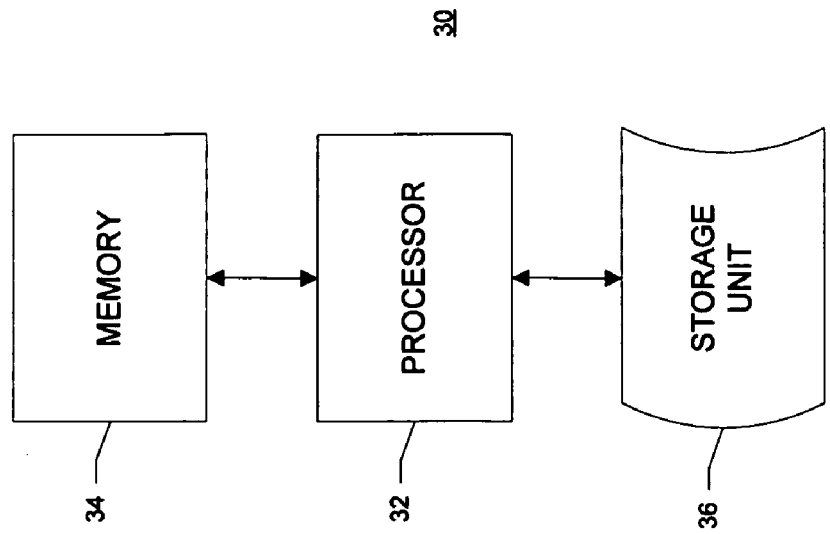
FIG. 2 is a block diagram of an exemplary apparatus according to an embodiment of the present invention.

The JVM 24 compiles and interprets the Java program 12 to operate on the hardware based platform 30. Different JVM 24 versions may be employed as a function of the underlying hardware based platform 30. The Java Program 12, however, does not change or need to be changed for different versions 24 and thus different hardware based platforms 30. FIG. 2 depicts an apparatus 30 in accordance with the present invention where the apparatus executes/hosts the hardware based platform and Java based platform.

The apparatus 30 includes a processor 32, a storage unit 36, and a memory 34. The processor 32 may be any suitable microprocessor that may be used to execute or host the platform 10. The storage unit 36 may be any known storage unit such as hard drive, floppy drive, CDROM, DVDROM, and optical drive. The storage unit 36 may be used to store program instructions that represent the platform 10 (Java Platform 20 and Hardware based platform 30). The memory 34 may be any memory device including Random Access Memory ("RAM"). The processor 32 may store program instructions and runtime data for the platforms 20 and 30 in the memory 34. In another embodiment, the memory 34 may be incorporated directly into the processor 32.

In one embodiment, the processor 32 may load the hardware based platform 30. When a user selects a Java program 12 to be executed, the hardware based platform 30 may invoke the Java Platform 20 by executing the JVM 24. The hardware based platform 30 may assign the JVM 20 one or more memory or storage areas 34 or 36. The JVM 24 creates a heap within the assigned memory area where the heap includes a runtime data area for all instances data variables. The JVM 24 compiles the Java program 12 to produce Java bytecodes. The JVM 24 then interprets the bytecodes to native instructions that are processed by the hardware based platform 30. The Java API includes numerous components that permit execution of many common functions. For example, the Java API includes a Java Database Connectivity ("JDBC") interface. The JDBC provides access to common relational databases.

Figure 3:
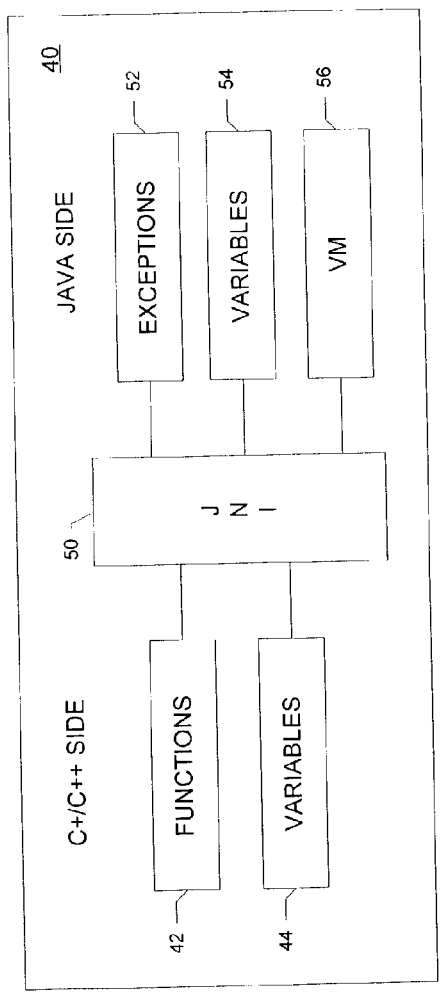
FIG. 3 is a block diagram of a Java native programming interface running in an application in which a method of the present invention may be employed.

The JDBC, however, may not provide the most efficient access for some database structures and may not be able to provide access to some legacy database systems. The Java API also includes a Java Native Interface ("JNI") (shown as 50 in FIG. 3). The JNI enables Java code run on a JVM to operate/interface with applications written in other programming languages, such as C+ and C++. FIG. 3 is a block diagram of a Java native programming interface 50 running in an application 40 in which a method of the present invention may be employed. In this application 40, the JNI 50 interfaces variables 44, 54 between a Java side and C+/C++ side. The JNI may also interface functions 42, exceptions 52, and the JVM 56. The JDBC and JNI may be employed in a Java program to enable access to extensive database systems.

Figure 5:
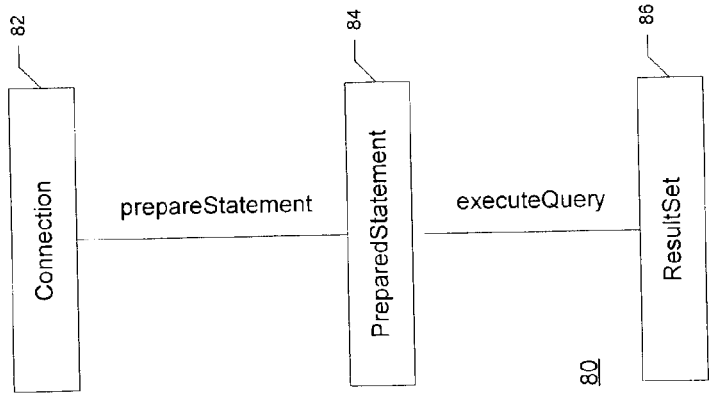
FIG. 5 is a block diagram of exemplary relationships between Java objects that may be employed in a database access model shown in FIG. 4.
Figure 4:
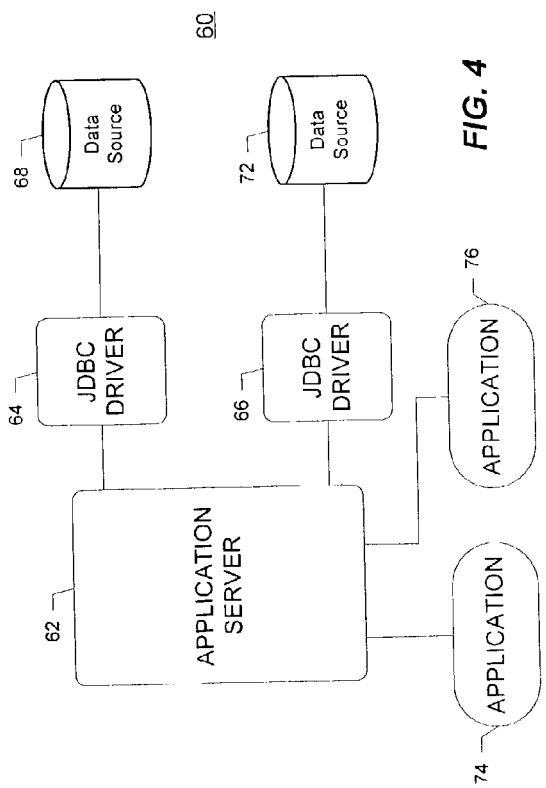
FIG. 4 is a block diagram of a Java database access model in which a method of the present invention may be employed.

FIG. 4 is a block diagram of a Java database access model 60 in which a method of the present invention may be employed. In this model, one or more Java applications 74, 76 may request data from one or more databases. The databases may be stored on one or more data sources 68, 72. A Java application server 62 processes the database access requests (such as a Structured Query Language ("SQL") statement) and employs one or more JDBC drivers 64, 66 to connect to the data sources 68, 72. FIG. 5 is a block diagram of exemplary relationships between Java objects that may be employed in the database access model shown in FIG. 4.

The object instance set 80 of FIG. 5 includes three JDBC class instances, a Connection instance 82, a PreparedStatement instance 84, and a ResultSet instance 86. The Connection instance 82 is used to connect to a data source, the PreparedStatement instance 84 is used to execute a database query (SQL) statement, and the ResultSet instance 86 is used to format and return the resultant data set (if any). In some applications the Connection instance may invoke a native application (such as C+) via the JNI to connect to a database.

The PreparedStatement 84 may similarly invoke a native application (such as C+) via the JNI to process a SQL statement. The Java platform 20 via the JVM 24 allocates area in the runtime data area for these instances. The JVM 20 also employs storage management system called a "garbage collector" to periodically or upon request clean the runtime data area.

The Java garbage collector searches for software objects that have gone out of scope. An object is considered out of scope when all variable references to the object are out of scope. The garbage collector then clears the object's associated variables from the runtime data area. Prior to clearing these variables, the Java garbage collector invokes or drives the out of scope object's finalize method. An object may include a finalize method that clears itself or synchronizes with other objects as required before cleaning itself. For example, when a PreparedStatement object goes out of scope, the JVM garbage collector invokes the PreparedStatement object's finalize method. When the PreparedStatement object employed a C/C++ program via the JNI, the finalize method may invoke the JDBC driver object 64, 66 to serialize or synchronize cleanup activity associated with the corresponding Connection object 82.

The JVM garbage collector waits for the finalize method thread to complete. For complex SQL statements, the finalize method may hang for long periods while the JDBC driver synchronizes the Connection object 82 with other Connection objects 82 linked to a data source 68, 72. In the interim, the garbage collector is also hung and other object variables that may be cleared from the runtime data area remain uncollected. Eventually, the runtime data area may become saturated and the JVM 24 may crash due to lack of memory. In one embodiment, the present invention employs the method 90 shown in FIG. 6 to prevent/limit garbage collection hang periods.

Figure 6:
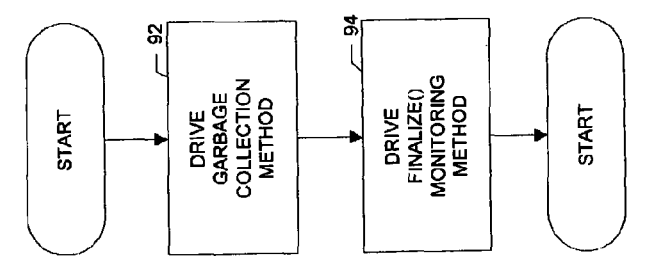

FIG. 6 is a flow diagram of an exemplary garbage collection/finalization method 90 according to an embodiment of the present invention. In this method 90, the JVM 24 drives or invokes a garbage collection method at step 92. The JVM 24 also invokes finalize monitoring method at step 94. The finalize monitoring method periodically checks the garbage collector finalize method( ) thread to determine whether the thread is hung. When the thread is hung, the finalize monitoring method may create an exception to break the finalize thread and permit the garbage collector to clear other out of scope objects.

Figure 7:
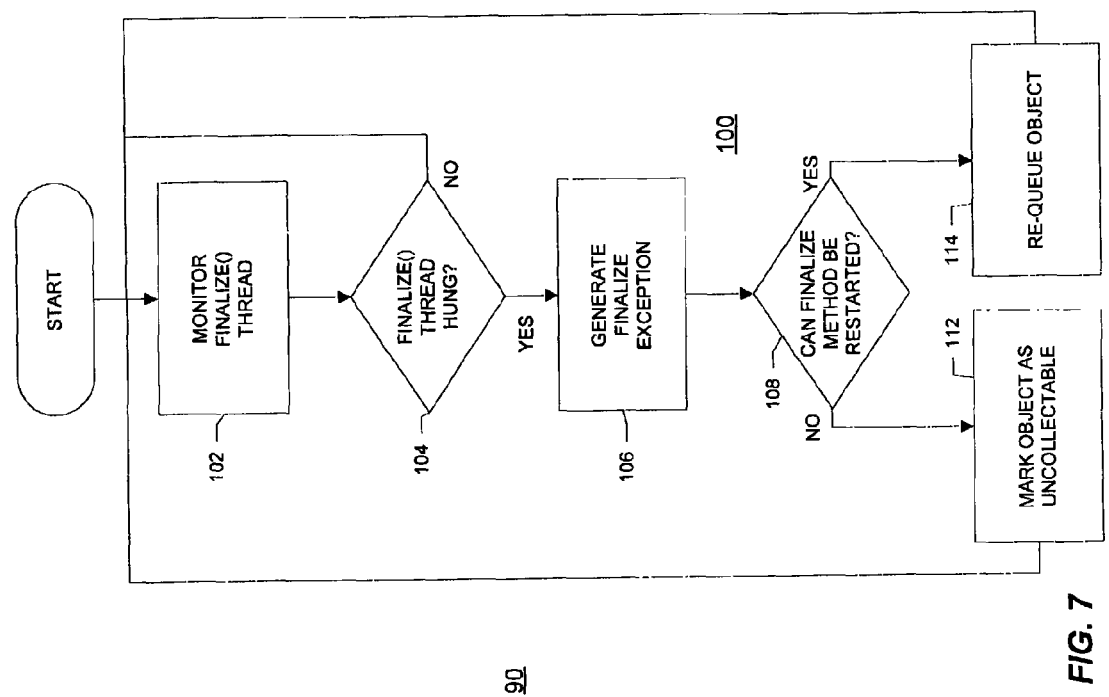

FIG. 7 is a flow diagram of an exemplary finalize monitoring method 100 according to an embodiment of the present invention. At step 102, the method 100 periodically monitors the garbage collector finalize method( ) thread. When the finalize method( ) thread is hung (step 104), e.g., program counter has not changed for a predetermined time interval, the method 100 generates a finalize exception 106. An object's finalize method may include numerous steps and the Java specification requires that the finalize method be only driven once. The method 100 determines whether the finalize method may be restarted at step 108. In one embodiment, the method 100 determines whether the finalize method had performed any significant activity prior to becoming hung. When the method 100 determines the finalize method may be restarted, the object is re-queued to cleaned by the garbage collection method (step 114). Otherwise, the object is marked as uncollectible and its variables are not cleaned from the runtime data area (step 112). The garbage collector may now, however, clean other objects versus waiting (for the uncollectible objects finalize thread to end).

Figure 8:
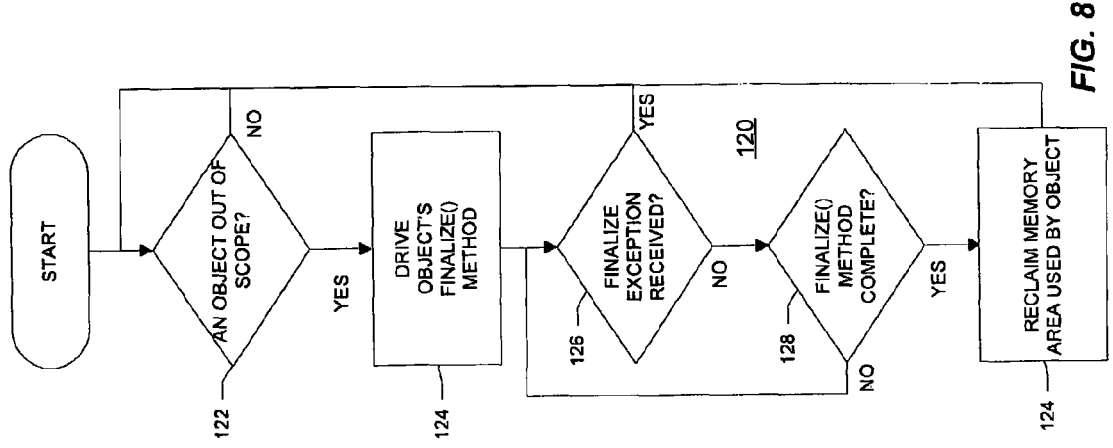
FIGS. 6 to 8 are flow diagrams of exemplary methods to be executed by the Java Platform according to an embodiment of the present invention.

FIG. 8 is a flow diagram of an exemplary garbage collection method 120 according to an embodiment of the present invention. The method first determines whether an object is out of scope at step 122. When an object is determined to be out of scope, the method drives the object's finalize method( ) thread at step 124. The method performs steps 126 and 128 until either a finalize exception is received (generated by method 100) or the object's finalize method( ) thread completes (step 128). When an exception is received, the method 120 searches for another out of scope object (step 122). Otherwise, when the finalize method( ) thread completes, the method 120 reclaims the memory area(s) used by the object.

The methods 100 and 120 enable the garbage collection method to continue when a finalize method( ) of an out of scope object hangs. In some cases, the hung object may be re-queued for cleaning/removal by the method 120. In either case, the garbage collection method 120 may attempt to clear other objects when a first object is not clearable within a predetermined time interval.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware (e.g., a software language other than Java, such as C++ or others may be used to implement the invention). As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

What is claimed is:

1. A method of clearing a runtime data area where a plurality of software objects store a variable and each of the plurality of software objects has a finalize method, comprising the steps of:
    driving an initial finalize method of a first software object, the initial finalize method comprising a finalize method for the first software object that synchronizes clean-up activity for resources of the first software object;
    clearing a runtime data area storing one or more variables associated with the first software object in response to the initial finalize method ending;
    generating a finalize exception in response to the initial finalize method not performing an operation for a predetermined time period;
    driving a next finalize method of a second software object in response to the generated finalize exception; and
    marking the first software object as uncollectible in response to the initial finalize method being non-restartable.

2. The method of claim 1, further comprising the step of marking the first software object as uncollectible in response to the initial finalize method not performing an operation for the predetermined time period.

3. The method of claim 1, further comprising the steps of:
    determining whether the initial finalize method is restartable in response to the initial finalize method not performing an operation for the predetermined time period; and
    re-queuing the first software object for collection in response to the initial finalize method being restartable.

4. The method of claim 1, further comprising the steps of:
    determining whether the initial finalize method is restartable in response to a finalize exception being generated; and
    re-queuing the first software object for collection in response to the initial finalize method being restartable.

5. The method of claim 1, wherein driving the initial finalize method of the first software object further comprises the steps of:
    determining whether the first software object is out of scope; and
    driving the initial finalize method in response to determining that the first software object is out of scope.

6. The method of claim 1, wherein the first software object is a Java™ object.

7. A method of clearing a runtime data area where a plurality of software objects store a variable and each of the plurality of software objects has a finalize method, comprising the steps of:
    driving a garbage collection method, the garbage collection method performing the steps of,
        driving an initial finalize method of a first software object, the initial finalize method comprising a finalize method for the first software object that synchronizes clean-up activity for resources of the first software object;
        clearing a runtime data area storing one or more variables associated with the first software object in response to the initial finalize method ending;
        driving a next finalize method of a second software object in response to a generated finalize exception;
    driving a finalize monitoring method, the finalize monitoring method performing the steps of,
        determining when the initial finalize method has not performed an operation for the predetermined time period;
        generating the finalize exception in response to the initial finalize method not performing an operation for a predetermined time period; and
        marking the first software object as uncollectible in response to the initial finalize method being non-restartable.

8. The method of claim 7, the finalize monitoring method further comprising the step of marking the first software object as uncollectible in response to the initial finalize method not performing an operation for the predetermined time period.

9. The method of claim 7, the finalize monitoring method further comprising the steps of:
    determining whether the initial finalize method is restartable in response to the initial finalize method not performing an operation for the predetermined time period; and
    re-queuing the first software object for collection in response to the initial finalize method being restartable.

10. The method of claim 7, wherein driving the initial finalize method of the first software object comprises the steps of:
    determining whether the first software object is out of scope; and driving the initial finalize method in response to determining that the first software object is out of scope.

11. The method of claim 7, wherein the first software object is a Java™ object.

12. A computer readable medium encoded with data instruction for clearing a runtime data area where a plurality of software objects store a variable and each of the plurality of software objects has a finalize method, such that when executed by a device, the device is caused to perform processes comprising:
   driving an initial finalize method of a first software object, the initial finalize method comprising a finalize method for the first software object that synchronizes clean-up activity for resources of the first software object;
   clearing a runtime data area storing one or more variables associated with the first software object in response to the initial finalize method ending;
   generating a finalize exception in response to the initial finalize method not performing an operation for a predetermined time period;
   driving a next finalize method of a second software object in response to the generated finalize exception; and
   marking the first software object as uncollectible in response to the initial finalize method being non-restartable.

13. A computer readable medium encoded with data instruction for clearing a runtime data area where a plurality of software objects store a variable and each of the plurality of software objects has a finalize method of claim 12, wherein the device is further caused to perform the step of marking the first software object as uncollectible when the initial finalize method has not performed an operation for the predetermined time period.

14. A computer readable medium encoded with data instruction for clearing a runtime data area where a plurality of software objects store a variable and each of the plurality of software objects has a finalize method of claim 12, wherein the device is further caused to perform the steps of:
   determining whether the initial finalize method is restartable in response to the initial finalize method not performing an operation for the predetermined time period; and
   re-queuing the first software object for collection in response to the initial finalize method being restartable.

15. A computer readable medium encoded with data instruction for clearing a runtime data area where a plurality of software objects store a variable and each of the plurality of software objects has a finalize method of claim 12, wherein the device is further caused to perform the steps of:
   determining whether the initial finalize method is restartable in response to a finalize exception being generated; and
   re-queuing the first software object for collection in response to the initial finalize method being restartable.

16. A computer readable medium encoded with data instruction for clearing a runtime data area where a plurality of software objects store a variable and each of the plurality of software objects has a finalize method of claim 12, wherein driving the initial finalize method of the first software object comprises the steps of:
   determining whether the first software object is out of scope; and
   driving the initial finalize method in response to determining that the first software object is out of scope.

17. A computer readable medium encoded with data instruction for clearing a runtime data area where a plurality of software objects store a variable and each of the plurality of software objects has a finalize method of claim 12, wherein the first software object is a Java™ object.

18. An apparatus for clearing a runtime data area where a plurality of software objects store a variable and each of the plurality of software objects has a finalize method, comprising:
   means for driving an initial finalize method of a first software object, the initial finalize method comprising a finalize method for the first software object that synchronizes clean-up activity for resources of the first software object;
   means for clearing a runtime data area storing one or more variables associated with the first software object in response to the initial finalize method ending;
   means for generating a finalize exception in response to the initial finalize method not performing an operation for a predetermined time period;
   means for driving a next finalize method of a second software object in response to the generated finalize exception; and
   marking the first software object as uncollectible in response to the initial finalize method being non-restartable.

19. The apparatus of claim 18, further comprising means for marking the first software objects as uncollectible when the initial finalize method has not performed an operation for the predetermined time period.

20. The apparatus of claim 18, further comprising:
   means for determining whether the initial finalize method is restartable in response to the initial finalize method not performing an operation for the predetermined time period;
   means for re-queuing the first software object for collection in response to the initial finalize method being restartable.

21. The apparatus of claim 18, further comprising:
   means for determining whether the initial finalize method is restartable in response to a finalize exception being generated;
   means for re-queuing the first software object for collection in response to the initial finalize method being restartable.

22. The apparatus of claim 18, wherein the means for driving the initial finalize method of the first software object comprises:
   means for determining whether the first software object is out of scope; and
   means for driving the initial finalize method in response to determining that the first software object is out of scope.

23. The apparatus of claim 18, wherein the first software object is a Java™ object.

* * * * *